(12) United States Patent
Brown

(10) Patent No.: US 8,573,455 B1
(45) Date of Patent: *Nov. 5, 2013

(54) SYSTEM AND HOLDER FOR SUPPORTING A TELEPHONE HEADSET IN A MOTOR VEHICLE

(75) Inventor: Kenneth J. Brown, West Chester, PA (US)

(73) Assignee: MSB Incorporated, Glenmoore, PA (US)

( * ) Notice: Subject to any disclaimer, the term of this patent is extended or adjusted under 35 U.S.C. 154(b) by 490 days.

This patent is subject to a terminal disclaimer.

(21) Appl. No.: 12/969,890

(22) Filed: Dec. 16, 2010

Related U.S. Application Data

(63) Continuation-in-part of application No. 11/859,774, filed on Sep. 23, 2007, now Pat. No. 7,857,178.

(60) Provisional application No. 60/848,443, filed on Sep. 29, 2006.

(51) Int. Cl.
*B60R 7/04* (2006.01)
*B60R 7/06* (2006.01)

(52) U.S. Cl.
USPC ............ 224/483; 224/547; 224/571; 224/929

(58) Field of Classification Search
USPC ......... 224/483, 279, 276, 442, 277, 929, 930, 224/197, 547, 571, 904, 678; D14/205
See application file for complete search history.

(56) References Cited

U.S. PATENT DOCUMENTS

| | | | |
|---|---|---|---|
| 4,097,012 A | 6/1978 | McIntyre | |
| 5,086,958 A | 2/1992 | Nagy | |
| 5,274,885 A | 1/1994 | Hellweg | |
| 5,484,066 A | 1/1996 | Luisi | |
| 5,511,705 A * | 4/1996 | Dreszer | 224/666 |
| 5,568,549 A | 10/1996 | Wang | |
| 5,593,124 A | 1/1997 | Wang | |
| 5,620,120 A | 4/1997 | Tien | |
| 5,979,724 A | 11/1999 | Loewenthal, Jr. et al. | |
| 6,036,071 A | 3/2000 | Hartmann et al. | |
| 6,371,345 B1 | 4/2002 | Leyden et al. | |
| 6,491,194 B2 | 12/2002 | Marvin | |
| 6,564,432 B1 | 5/2003 | Kushner | |
| 7,099,466 B2 | 8/2006 | Walsh | |
| 7,099,467 B1 | 8/2006 | Rohrbach | |
| D544,476 S | 6/2007 | Wilson et al. | |
| D550,450 S | 9/2007 | Dong | |
| D578,508 S | 10/2008 | Wang | |
| D587,683 S | 3/2009 | Ham et al. | |
| D587,684 S | 3/2009 | Ham et al. | |
| D589,031 S | 3/2009 | Bentley et al. | |

(Continued)

*Primary Examiner* — Justin Larson
(74) *Attorney, Agent, or Firm* — Allen, Dyer, Doppelt, Milbrath & Gilchrist, P.A.

(57) ABSTRACT

A holder for a mobile telephone headset includes a base and arm members extending outwardly from the base with a receiving member attached to ends of the arm members. The receiving member includes spaced apart upright members forming a gap for loosely receiving an ear bud of the mobile telephone headset. A clip may be removably attached to the base for removably securing the holder to a support structure within a motor vehicle. The holder further includes illumination for locating it or the headset in a darkened environment. Yet further, the arm members are spaced apart to form an opening sufficient for receiving an ear hook of the headset, the holder thus providing ease for a user to safely store the mobile telephone headset.

28 Claims, 8 Drawing Sheets

(56) References Cited

U.S. PATENT DOCUMENTS

| | | |
|---|---|---|
| D589,492 S | 3/2009 | Mistry |
| D593,998 S | 6/2009 | Bentley et al. |
| D601,134 S | 9/2009 | Elabidi et al. |
| D601,543 S | 10/2009 | Bentley |
| D602,001 S | 10/2009 | Bentley |
| D602,008 S | 10/2009 | Bentley et al. |
| D617,316 S | 6/2010 | Elabidi et al. |
| 2004/0040994 A1 | 3/2004 | Parcelles |
| 2009/0273316 A1 | 11/2009 | Lee |
| 2010/0008528 A1 | 1/2010 | Isvan |
| 2010/0020998 A1 | 1/2010 | Brown et al. |
| 2010/0137038 A1 | 6/2010 | Scholz et al. |

* cited by examiner

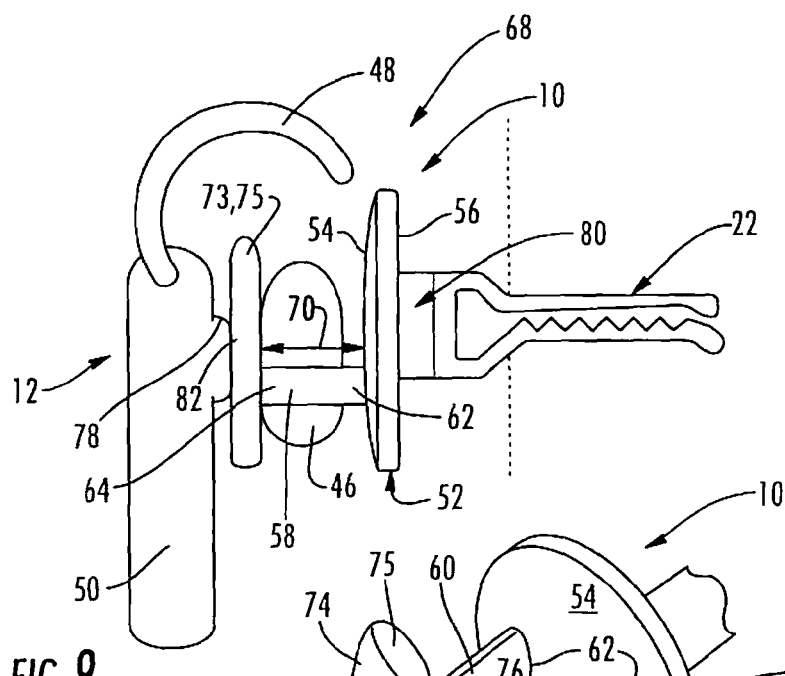
FIG. 9
FIG. 8
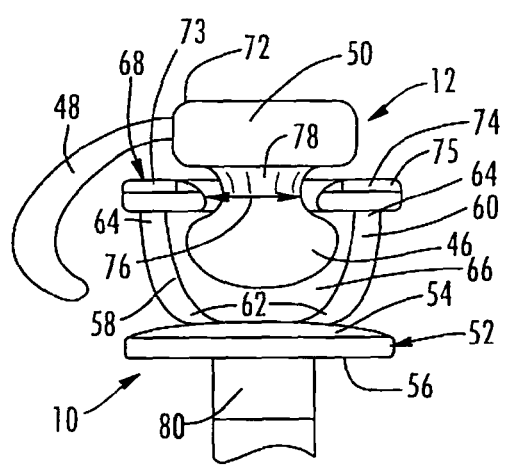
FIG. 10
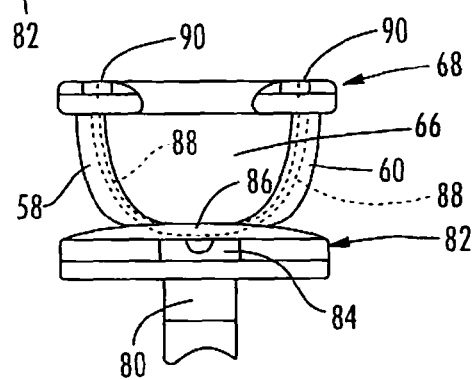
FIG. 11

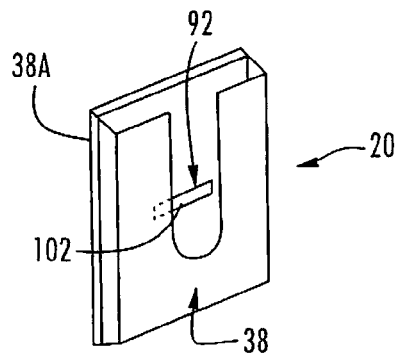
FIG. 12B
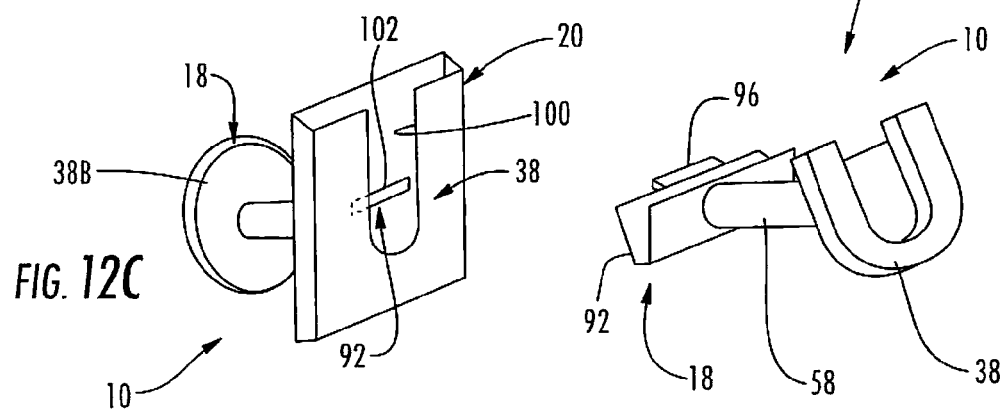
FIG. 12C
FIG. 12A
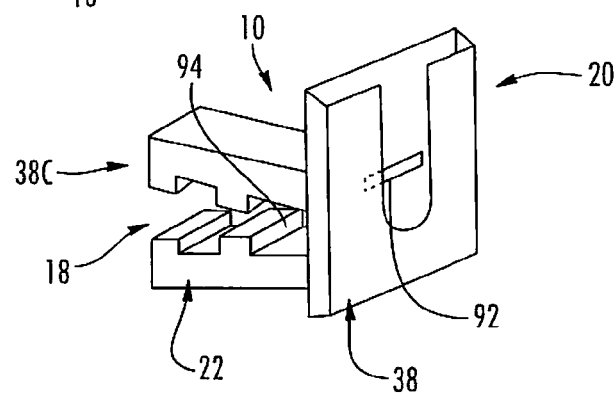
FIG. 12D

SYSTEM AND HOLDER FOR SUPPORTING A TELEPHONE HEADSET IN A MOTOR VEHICLE

CROSS-REFERENCE TO RELATED APPLICATIONS

This application is a continuation-in-part of U.S. patent application Ser. No. 11/859,774, filed Sep. 23, 2007, and issued at U.S. Pat. No. 7,857,178 on Dec. 28, 2010, which itself claims priority to U.S. Provisional Patent Application Ser. No. 60/848,443, filed Sep. 29, 2006, the disclosures of which are hereby incorporated by reference herein in their entireties and all commonly owned.

FIELD OF THE INVENTION

This invention relates to an accessory for use in an automobile to support a headset for convenient access and, more particularly, to a universal holder detachably affixed to a surface on the interior of the automobile to support the headset of a cellular telephone and other electronic devices.

BACKGROUND OF THE INVENTION

Portable electronic devices, such as cellular telephones, digital music players and other communication devices have enjoyed increased acceptance and a proliferation in usage throughout the population. Often these electronic devices are utilized with a headset, particularly cellular telephones and related electronic communication devices. The headsets come in many different sizes and configurations, including ones mounted on the ear, ones that fit into the ear, and ones that clamp on top of the head of the wearer. When the headsets are not being utilized, they are typically stored someplace until the headset is needed again. When in an automobile, that storage place can be in a cup holder, around a gear shift lever, in some covered storage compartment, or other inconvenient or inaccessible location.

The placement of electronic devices in automotive cup holders is reflected in U.S. Pat. No. 7,099,467, issued to Matthew Rohrbach on Aug. 29, 2006, wherein an insert is positionable into the top of the cup holder. The insert is formed with a receptacle in which an electronic device, such as a digital music player, can be inserted for support thereof in the automobile. Adapting sleeves are disclosed to permit the insert to fit in a variety of differently sized cup holders. A similar device is disclosed in U.S. Pat. No. 7,099,466, granted on Aug. 29, 2006, to Sean Walsh wherein the insert has a pair of flexible members that resiliently deform to fit into the interior of an automotive cup holder. The insert has an upwardly extending pedestal on which a cell phone or other electronic device can be detachably mounted.

Other devices for mounting a cell phone from structure on the interior of an automobile other than the cup holder are also provided in U.S. Pat. No. 6,491,194, granted on Dec. 10, 2002, to Ernest Marvin wherein a sleeve-like device is detachably mounted to the dash or other solid surface by an adhesive strip or by hook and loop fastener strip. The cell phone is slidable into the holding sleeve to be retained within the device in a convenient location until needed. In U.S. Pat. No. 5,568,549, granted to Chin-Yang Wang on Oct. 22, 1996, a similar sleeve-like device is mounted on the end of a deformable connector member that is attached to a base member equipped with suction cups for attachment of the device to a smooth, solid surface, such as the interior surface of the windshield of an automotive vehicle.

Other detachable devices have been provided for holding miscellaneous articles, such as eyeglasses, pens or pencils, with a device detachably mounted on the surface of an automotive vehicle. U.S. Pat. No. 5,484,066, issued to Thomas Luisi on Jan. 16, 1996, discloses an object holder formed with a plurality of semi-circular members that are deformable to snuggly support a generally cylindrical object such as a pen or pencil. The clip members are formed in different sizes to be engaged with differently sized objects. U.S. Pat. No. 6,564,432, granted on May 20, 2003, to Robert Kushner, teaches a clip-on device for supporting personal articles, such as eyeglasses. This device is detachably mounted by clipping onto an automotive sun visor or by an adhesive strip attaching the device to a solid surface within the interior of an automobile.

None of the above-identified prior art documents are specifically adapted for use with headsets, although some, such as the clip-on device of U.S. Pat. No. 6,564,432, could be adapted to accomplish the task of supporting a headset. Nevertheless, the support of a headset in the clip-on device of U.S. Pat. No. 6,564,432 would not make the headset conveniently accessible to an occupant of the automotive vehicle as the spring-loaded device would positively clasp the personal article to prevent an easy release thereof. It would be desirable to provide a holder that would be operable to receive and engage a headset for an electronic device, such as a cellular telephone, so that the headset could be quickly and easily accessed. It would also be desirable that the holder be capable of engagement with substantially all forms and configurations of headsets without requiring adapters for use with specific devices. It would further be desirable that the headset holder be formed in a manner to be associated with a selected manner of attachment to the surface of the interior structure of the automotive vehicle.

SUMMARY OF THE INVENTION

Embodiments of the invention are directed to overcoming disadvantages of the prior art by providing a universal holder for a mobile telephone headset that is easily mounted within a motor vehicle, such as on an automobile dashboard, for conveniently holding a variety of headsets. Embodiments may include means for the holder to be selectively mounted on vehicle components such as an air conditioning grille. Embodiments of the invention may comprise alternate attachment members for mounting the holder on selected surfaces of an automobile dashboard.

Problems in the art are overcome by embodiments of the invention that permit receipt of currently known mobile telephone headsets for support and storage when not in use within an automobile.

It is another advantage of this invention that the universal telephone headset holder can store a mobile telephone headset for convenient access by the operator of an automobile. Embodiments of the invention may comprise a receiver member mounted on preselected attachment members for deployment at the convenience of the operator. The receiver member may be selectively removed from the attachment member for deployment with a different attachment member. By way of example, there is an advantage to have a headset holder that may be detachably mounted on an air conditioning louver within reach of an operator of an automotive vehicle.

Various combinations of features according to the teachings of the present invention may be employed to solve known problems associated with use of a telephone headset within a motor vehicle. By way of example, a receiver member may be formed in a U-shaped configuration to receive ear pieces. The receiver member may be formed with a generally linear support member interconnecting the attachment member and the receiver member to provide support for telephone headsets that have curved members that can rest thereon. Embodiments of the invention permit the telephone headset to be desirably stored at an elevated location on the dashboard so that the operator of the automobile does not have to divert attention from the road in order to find the telephone headset to talk on a mobile telephone.

These features and advantages are accomplished according to the instant invention by providing a universal mobile telephone headset holder that includes a U-shaped receiver member, configured to hold an earpiece, and a generally linear support member that is capable to engage a curved member on a telephone headset not having an earpiece to support the headset within convenient reach of an operator of an automobile vehicle while the headset is not in use. The receiver member can be configured for mounting in different attachment members to be detachable therefrom. The attachment member can be in the form of a clip engagable with an air conditioning vent grille louver or an adhesive member that is simply stuck on a flush surface of the dashboard. Through the universal telephone headset holder, the headset can be supported at an elevated location to be accessed when the phone rings without searching for the headset.

One embodiment of the invention may be described as a holder for a mobile telephone headset, the headset having an ear bud and an ear hook extending from a body thereof, wherein the holder may comprise a base having a first surface and an opposing second surface, first and second arm members extending outwardly from the base, the first and second arm members having proximal and opposing distal ends, wherein the distal ends are affixed to the first surface of the base, and wherein the first arm member is spaced from the second arm member so as to form an opening therebetween, a receiving member attached to the distal ends of the first and second arm members so as to be in a spaced relation to the first surface of the base, the receiving member having opposing first and second upright members forming a gap therebetween dimensioned for loosely receiving the ear bud of the mobile telephone headset, attachment means carried on the second surface of the base, and an attachment member removably connected to the attachment means for removably securing the holder to a support structure.

Further, the first and second upright members may include tapered free ends, the free ends sufficiently tapered for effectively widening the gap and providing an opening into the gap for guiding the ear bud therein. There may be a cover layer extending over the receiving member for providing an enhanced frictional contact with the ear bud carried thereby. Yet further, the opposing first and second upright members may include a recessed portion extending within an outside surface thereof, the recessed portion forming a pocket.

Embodiments of the invention may further include the first surface of the base having an arcuate shape and the receiving member may comprise a generally U-shaped member defined by the first and second upright members forming the gap therebetween. The attachment means may optionally comprises mounting tab connectable within a slot formed in the attachment member to secure engagement therebetween, and wherein the attachment member is at least one of an adhesive member, a suction cup member, and a mounting clip.

For providing ease in locating the holder within a darkened environment, the holder may further comprise a light source carried by the holder, wherein the light source is sufficient for illuminating at least a portion of the holder for a locating thereof in the darkened environment. The light source may be carried by the base, wherein the arm members and the receiving member are formed from a material capable of transmitting light and providing an illumination thereof. Optionally, an optical fiber may be operable with the light source and may extend to preselected portions of the holder for providing illumination.

BRIEF DESCRIPTION OF THE DRAWINGS

The advantages of this invention will become apparent upon consideration of the following detailed disclosure of the invention, especially when taken in conjunction with the accompanying drawings wherein:

FIG. 8 is a partial perspective view of another holder according to the teachings of the present invention;

FIG. 9 is a side view of the embodiment of FIG. 8 illustrating a headset carried thereby;

FIG. 10 is a top view of the embodiment of FIG. 9;

FIG. 11 a partial perspective view of another holder according to the teachings of the present invention, wherein the holder includes illumination;

FIGS. 12A-12D are perspective views of various configurations of a headset holder in which the receiving portions are selectively attachable to alternate attachment portions, all in keeping with the teachings of the preset invention;

DETAILED DESCRIPTION OF EMBODIMENTS

The present invention will now be described more fully hereinafter with reference to the accompanying drawings, in which various preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
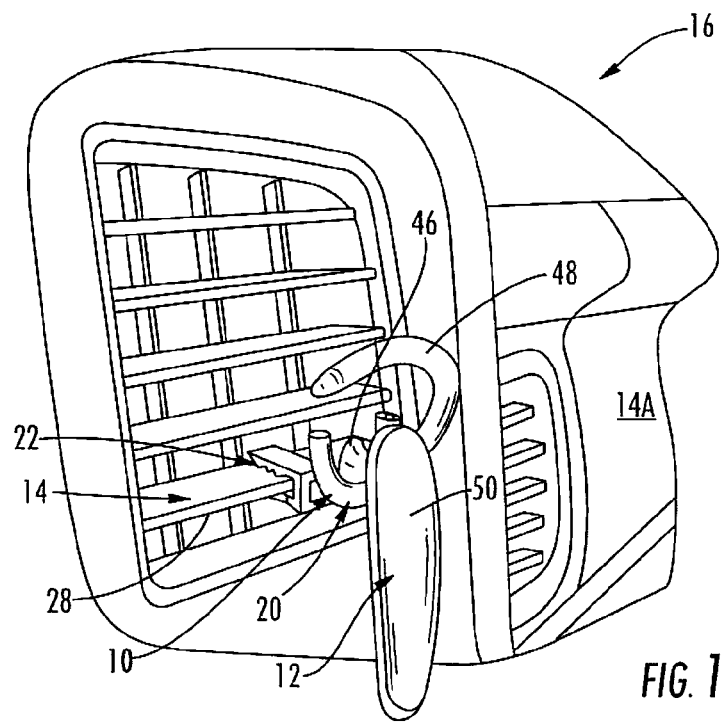
FIGS. 1 and 1A are diagrammatical partial front perspective views of an automobile dashboard on which is mounted a headset holder incorporating the principles of the present invention.

Referring initially to FIG. 1, a universal holder 10 for a headset 12 of an electronic device, such as a cellular telephone, incorporating principles of the instant invention, is illustrated by way of example. The holder 10 is preferably detachably connected to a surface 14 on an interior of a motor vehicle such as an automobile 16 and may be affixed through an adhesive strip, strip of hook and loop fastener, clip, and the like that will permit the holder 10 to be mounted in a temporary manner on the surface of the interior. Alternative mounting configurations will come to the mind of those skilled in the art having the benefit of the teachings of the present invention and embodiments described below. Such mounting structures may comprise a suction cup that will adhere to a smooth solid surface, such as the interior surface of the front windshield of the automobile, or a mounting clip, described in greater detail below, that will enable the holder 10 to be temporarily attached to a louver of an air conditioning vent in the automobile, by way of example.

Figure 2:
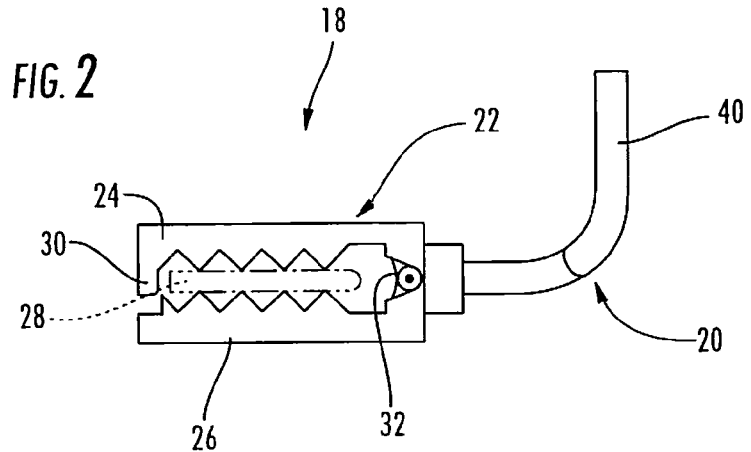
FIG. 2 is a side elevational view of one headset holder according to the teachings of the present invention.
Figure 3:
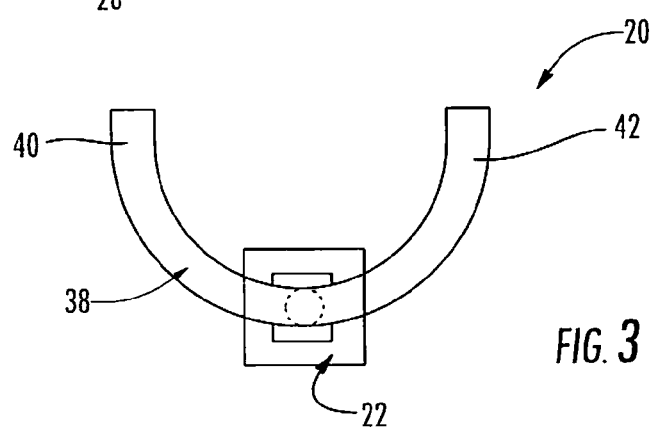
FIG. 3 is a front elevational view of the holder shown in FIG. 2.
Figure 4:
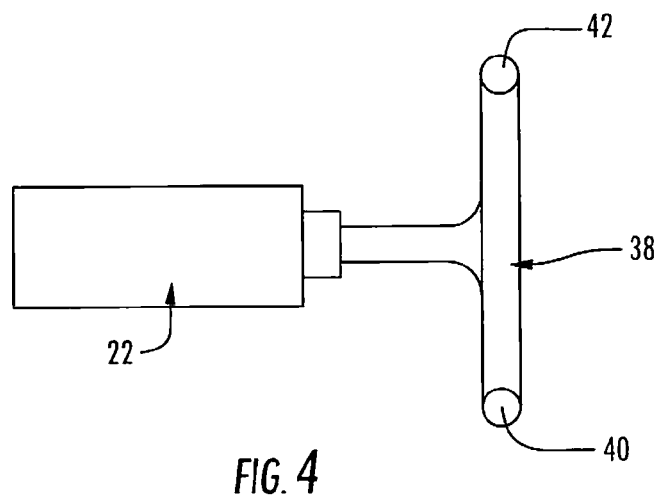
FIG. 4 is a top plan view of the holder shown in FIG. 2.

As illustrated with reference to FIGS. 2-4, the holder 10 may be described as including an attachment portion 18 and a headset receiving portion 20. The attachment portion 12 can be formed in any one of the configurations noted above such that the receiving apparatus 20 is supported at an elevated position on the motor vehicle 16. As illustrated with continued reference to FIGS. 1-4, the attachment portion 18 is formed as a mounting clip 22 that has an upper leg 24 and an opposing lower leg 26 that are spaced apart sufficiently to receive the thickness of an air conditioning vent louver 28 therebetween. Preferably, each leg 26, 28 is formed with a convoluted or textured grip surface to enhance the engagement between the smooth surface of the vent louver 28 and the legs, including a nodule 30 at a distal end of at least one of the legs to slip behind the louver so as to help secure the mounting clip 22 to the louver. The legs 24, 26 are preferably pivotally connected together and inter-engaged with a spring 32 that will exert a biasing force on the legs toward one another and affect a gripping of the air conditioning vent louver 28, or the like by way of example.

Figure 5:
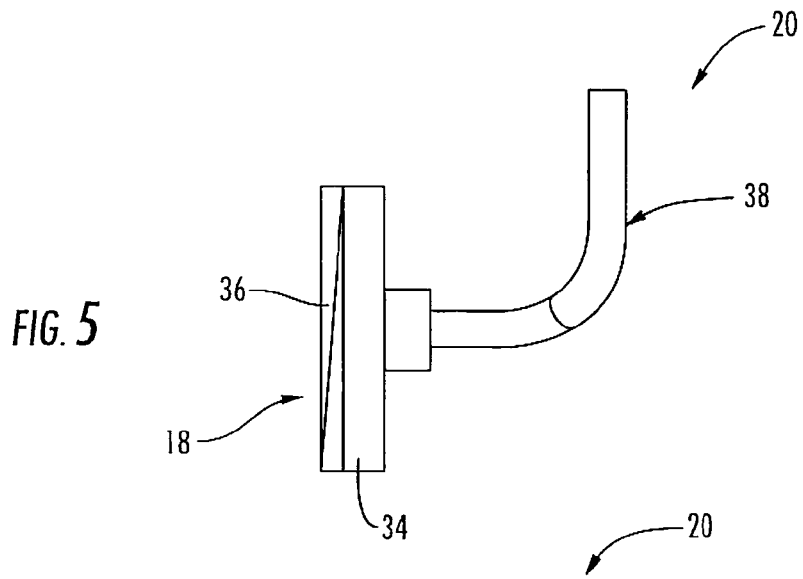
FIG. 5 is a side elevational view of an alternate embodiment of the invention including a holder having an alternate attachment member for mounting the headset holder.
Figure 6:
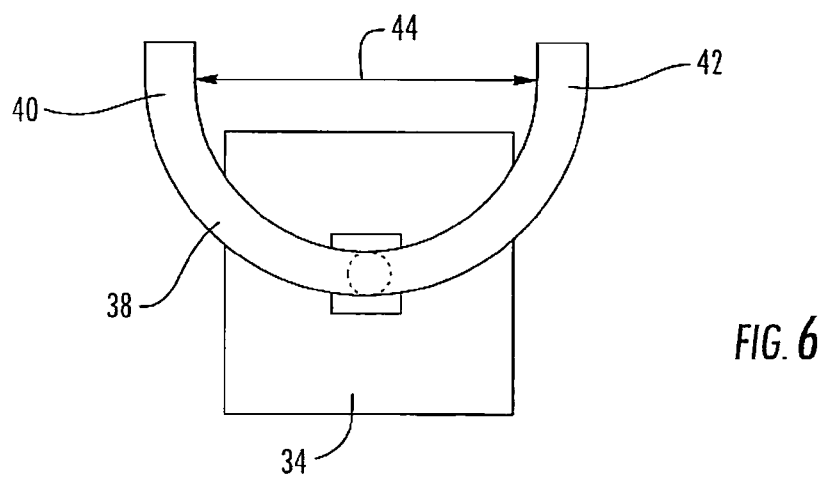
FIG. 6 is a front elevational view of the holder shown in FIG. 5.
Figure 7:
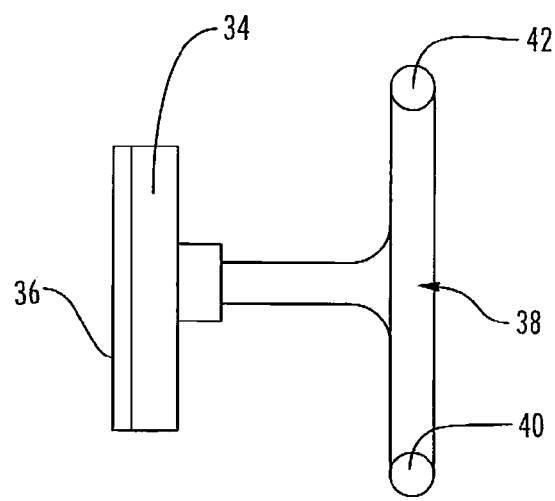
FIG. 7 is a top plan view of the holder shown in FIG. 6.

An alternative attachment portion 18 is illustrated with reference to FIGS. 5-7. The fastening portion 18 has mounting block 34 on which is secured a foam adhesive strip 36 for adhering to a substantially flat surface on the interior of the automobile 16, such as a vertically oriented surface 14 of an automotive dash, as illustrated with reference again to FIG. 1. The receiving portion 20 is as described below. One skilled in the art will recognize that other fastening devices can be utilized, including a suction cup, and that some fastening devices provide a desirable flexibility in positioning the holder 10, as well as a desirable flexibility in detaching and repositioning the holder 10.

Figure 1A:
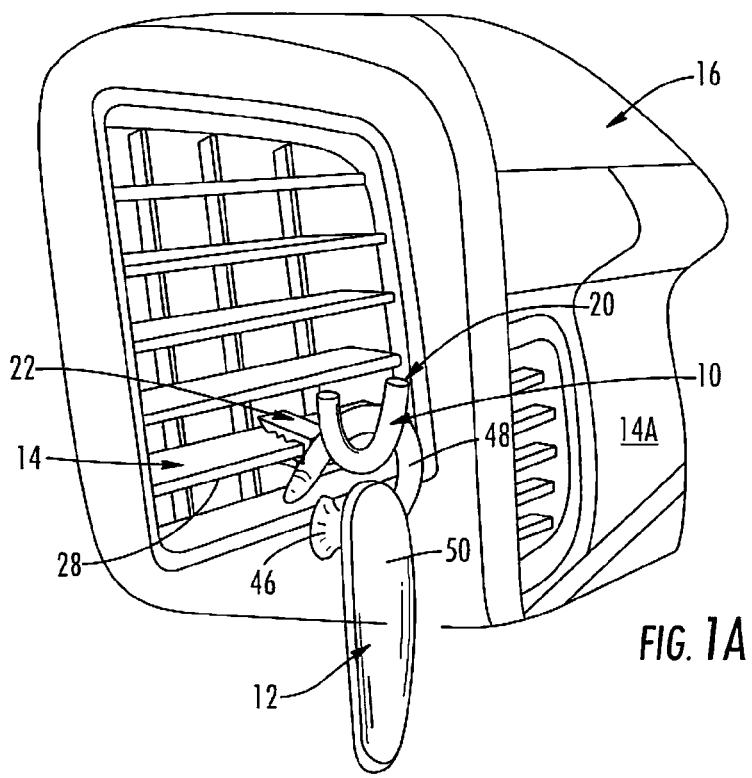

With continued reference to FIGS. 2-7, the receiving portion 20 projects outwardly from the attachment portion 18 and is formed with a receiving member 38 that includes at least one upwardly extending member 40 to engage or restrain from movement the headset 12 mounted thereon, as earlier described with reference to FIG. 1. In such a configuration, the single upwardly extending member 40 may be shaped as a hook, or in an L-shaped configuration extending outwardly from the attachment portion 18 and then projecting upwardly. Preferably, however, the receiving member 38 will include a pair of laterally spaced upright members 40, 42 that define a gap 44 or space therebetween in which a structural component of the headset 12 connected to a mobile telephone can be positioned so as to be supported at a location that is convenient for accessing as needed, as illustrated with reference again to FIG. 1 and now to FIG. 1A. The upright members 40, 42 are preferably joined at a lower portion thereof to create a U-shaped configuration. Alternatively, the upright members 40, 42 can be joined in a V-shape.

One skilled in the art will recognize that the upright members can be formed from different materials, including a semicircular, half-tube member bent or shaped into a U-shaped configuration attached to the fastening portion. Top ends of the upright members 40, 42 may be formed with laterally oriented and aligned grooves to facilitate an associated function, such as wrapping a cord from the headset to raise the cord out of the way from the operative controls of the vehicle. Preferred embodiments of the U-shaped receiving portion, including the receiving member and the upright members are formed from plastic, which may be injection molded.

With reference again to FIGS. 1 and 1A, and now to now to FIGS. 8-10, one holder 10 for the mobile telephone headset 12 having an ear bud 46 and an ear hook 48 extending from a body 50 is herein described as including a base 52 having a first surface 54 and an opposing second surface 56. First and second arm members 58, 60 outwardly extend from the base 52. The first and second arm members are herein described as including proximal and opposing distal ends 62, 64, wherein the proximal ends are affixed to the first surface 54 of the base 52, and wherein the first arm member 58 is spaced from the second arm member 60 so as to form an opening 66 between them. With continued reference to FIGS. 8-10, the receiving portion 20 includes a receiving member 68 attached to the distal ends 64 of the first and second arm members 58, 60 so as to form a space 70 between the receiving member and the first surface 54 of the base 50. The receiving member 68 includes opposing first and second upright members 72, 74 forming a gap 76 between them for loosely receiving a neck portion 78 of the ear bud 46. The first surface 54 is preferably arcuate for providing a guiding entry of the ear bud 46 or ear hook 48 into the space 70. The attachment portion 18 of the holder 10 is carried on the second surface 56 of the base 52. Attachment means in the form of an attachment member 80, such as the clip 22 earlier described, is removably connected to the attachment member 80 for removably securing the holder 10 to a support structure, such as the AC vent louver 28 earlier described with reference to FIG. 1.

With continued reference to FIGS. 8-10, the first and second upright members 72, 74 include tapered free ends 73, 75, the free ends sufficiently tapered for effectively widening the gap 76 and providing an opening into the gap for guiding the ear bud 46 therein. A cover layer 82 extends over the receiving member 68 for providing an enhanced frictional contact with the ear bud 46.

With reference now to FIG. 11, by way of example, the holder 10 may optionally include a light source 84 carried by the base 52, wherein the light source illuminates at least a portion of the holder for locating it in a darkened environment. Optionally, the arm members 58, 60 and/or the receiving member 68 are formed from a material capable of transmitting light and providing an illumination thereof. Yet further, optical fiber may be operable with the light source 84 and extend to preselected portions of the holder for providing illumination.

Referring now to the diagrammatical illustrations of FIGS. 12A-12D, alternate connections between the fastening attachment portion 18 and the receiving portion 20 can best be seen. As illustrated with reference to FIG. 12A, the receiving portion 20 may optionally be connected to the attachment portion 18 using a single arm member 58 to interconnect the receiving member 38 and the attachment portion 18. The arm member 58 is formed with the attachment portion 18 that will permit a preselected attachment of a desired fastening to the arm member. The holder 10 may be manufactured with the receiving portion 20 including the arm member 58 and the receiving member 38, as an integral component, and the attachment portion 18 manufactured as a separate disconnected member formed in different configurations.

By way of example, and with reference to FIGS. 12B-12D, the holder 10 may have the receiving member 38 and different attachment portions 18, such as an adhesive fastening portion 38A, a suction cup fastening portion 38B, and a clip-on fastening portion 38C, as illustrated with reference to FIGS. 12B, 12C, and 12D, respectively. As a consequence, a purchaser of the holder 10 may then select which of the three attachment portions 18 is desired, and then attach the selected attachment portion 38 to a connector 92 on the arm member 58 to assemble the holder 10.

With continued reference to FIGS. 12B-12D, the connector 92 may include a spring clip 94 having a retention tab 96 slidable into a receiver 98, optionally in the form of a channel 100 on the attachment portion 18. The spring clip 94 deflects when placed into the channel 100 until the retention tab 96 pops into an opening 102 in the receiver 98 of the receiving portion 20. One skilled in the art will readily recognize that the receiver and the spring clip connector could be reversed with the spring clip connector on the fastening portion and the receiver on the arm member. Furthermore, one of ordinary skill in the art will recognize that other forms of receivers and connectors are also applicable to the joining of the fastening portion to the arm member.

Examples of such alternative connecting structure may include a fastening pin as the connector having a flanged head that would yield to permit passage into an opening formed in the arm member for a snug fit therebetween. Once the flanged head passed into the opening, the flanged head would spring back into the normal position and retain the attachment portion on the arm member. In such configurations, the attachment portion would be permanently attached to the arm member, while in the channel and connector, the attachment portion may be removed from the arm member and a different configuration substituted therefor.

With reference again to FIGS. 8-10, and now FIGS. 13-16, the holder 10 may be described as including receiving member 68 molded in a U-shaped configuration and attached to the base 52 by the laterally spaced arm members 58, 60 that provide enhanced stability to the receiving member. The receiving member 68 may alternatively include a recess 104 defining a front pocket to assist in receiving certain headset configurations. The back side or second surface 56 of the base 52, herein presented as a disc, has molded onto it a mounting tab 106 that is engagable with the attachment member 80. Optionally, each of the arm members 58, 60 is formed with a stop member 108 that limits movement of the ear hook 48, by way of example, or other headset components resting on the arm members so that the headset 12 is not moving back and forth in response to accelerations and decelerations of the vehicle 16.

Figure 13:
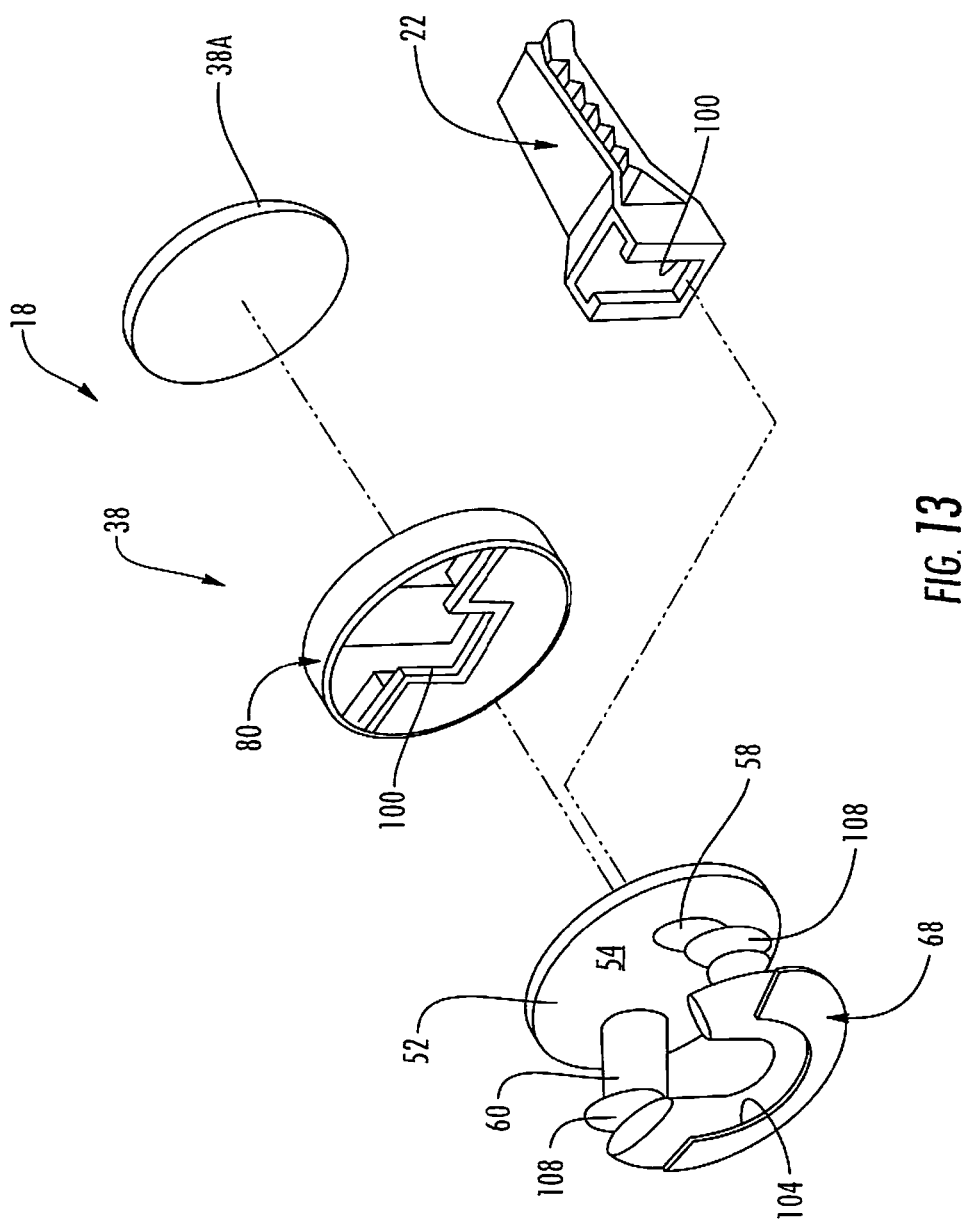
FIG. 13 is an exploded perspective view of one embodiment of the invention including a headset holder.
Figure 16:
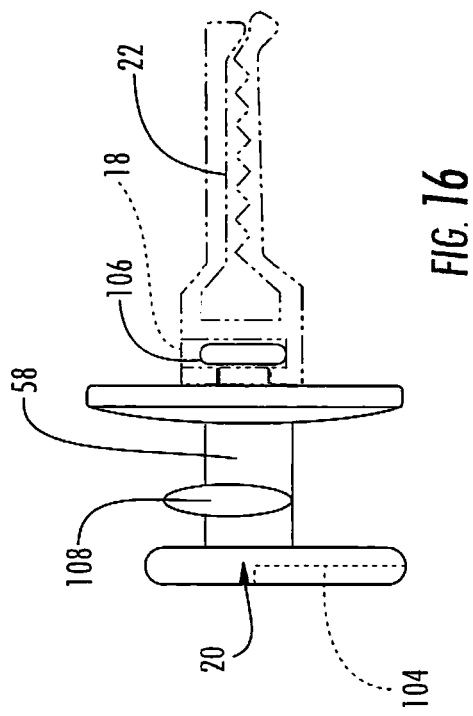
FIG. 16 is a partial side elevational view of the receiving portion of FIG. 14 with a clip member illustrated in phantom.
Figure 14:
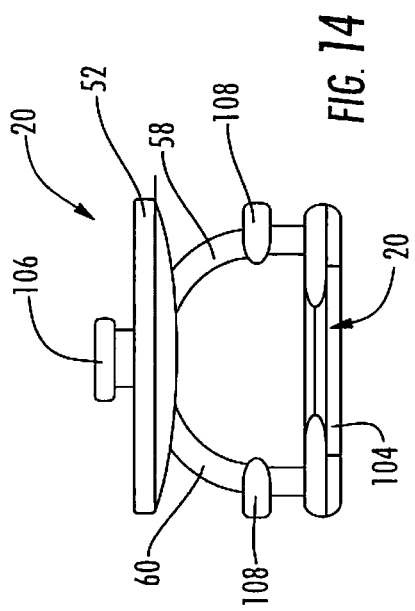
FIG. 14 is a top plan view of the receiving portion of the holder in FIG. 13.
Figure 15:
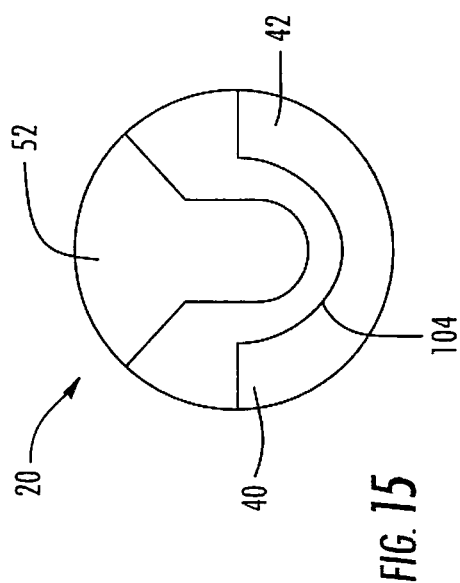
FIG. 15 is a front elevational view of the receiving portion of FIG. 14.

As illustrated with reference to FIG. 13, while only the adhesive member 38A and the mounting clip 22 are depicted, other forms of the attachment portion 18 and the attachment member 80, such as the suction cup 38B, as earlier described are also within the scope of the invention. Each of the alternative attachment members 38 are formed with the receiver channel 100 into which the mounting tab 106 is engaged. Each of the receiver channels are formed substantially identically and define a slot into which the mounting tab snuggly fits so that the receiving portion is stable when connected to the attachment portion.

Figure 19:
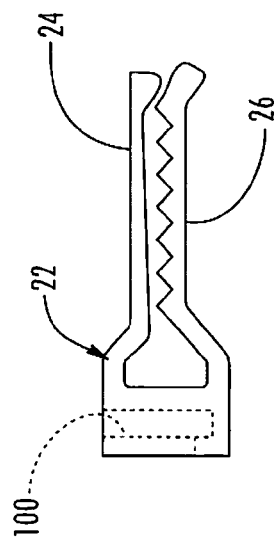
FIGS. 17-19 are top, front, and side views of a mounting clip useful in an attachment portion of embodiments of the invention.
Figure 17:
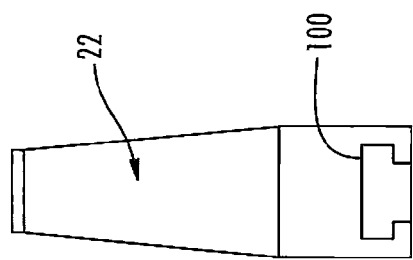
Figure 18:
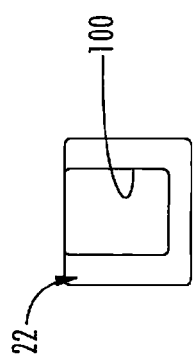

FIGS. 17-19 isolate the mounting clip 22 and present various view showing elements as above described.

With reference again to FIGS. 1 and 1A, the use of the holder 10 can accommodate the storage of a Bluetooth® form of a headset having an ear mounting member that can be received on the arm members with the receiver member preventing the ear bud from sliding off the holder. When the user desires to access the headset, he simply reaches to the holder 10, grasps the headset 12 and lifts the ear bud 46 off the headset receiving portion 20 to disengage the headset from the holder for use as desired.

As above supported, a different configuration of a headset having a foam covered speaker member that fits on the ear of the user can also be mounted on the holder 10. The receiving portion 20 cradles the foam covered speaker member between the two upright members 72, 74 to restrain the headset 12 on the holder 10. Since the center of gravity of the headset is typically below the receiver portion, the foam covered speaker member will remain mounted therein. To remove the headset from the holder 10, the user simply grasps the headset 12 and lifts the ear bud 46 above the cradle formed by the receiver member to free the headset for use as needed.

The holder 10 is structured for engagement with substantially every known form of a headset to provide a universal support member for all forms of headsets. The receiver member can directly receive some component of the headset, such as a headset having a foam covered speaker member, or serve as a retainer member to prevent an engaged headset from sliding off the arm members, such as with the Bluetooth® form of a headset. The provision of different fastening portion configurations also provides substantial flexibility in where the holder can be mounted. Accordingly, the holder 10 can be mounted on an interior surface of the automobile to conform to and provide the greatest convenience of the user of the headset. Furthermore, the provision of a detachable attachment portion for mounting the holder, such as by re-adhering the adhesive fastening portion to another surface, or re-locating the mounting clip to a different position, allows the holder be positioned and re-positioned at the whim of the user to maximize convenience in usage.

It will be understood that changes in the details, materials, steps and arrangements of parts which have been described and illustrated to explain the nature of the invention will occur to and may be made by those skilled in the art upon a reading of this disclosure within the principles and scope of the invention. For example, one skilled in the art will readily recognize that the upright members could be formed of frangible plastic so that the receiver member will safely disintegrate upon impact. Furthermore, the upright members may be covered with a foam or soft material to soften the engagement between the headset and the receiving portion and to provide a greater frictional engagement therebetween.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of claims supported by this disclosure.

That which is claimed is:

1. A holder for a mobile telephone headset, the headset having at least one of an ear bud and an ear hook extending from a body thereof, the holder comprising:

a base having a first surface and an opposing second surface;

first and second arm members extending outwardly from the base, the first and second arm members having proximal and opposing distal ends, wherein the proximal ends are affixed to the first surface of the base, and wherein the first arm member is spaced from the second arm member so as to form an opening therebetween;

a receiving member attached to the distal ends of the first and second arm members so as to be in a spaced relation to the first surface of the base, the receiving member having opposing first and second upright members forming a gap therebetween dimensioned for loosely receiving the ear bud of the mobile telephone headset within said gap and said opening;

attachment means carried on the second surface of the base; and an attachment member removably connected to the attachment means for removably securing the holder to a support structure.

2. The holder according to claim 1, wherein the first and second upright members include tapered free ends, the free ends sufficiently tapered for effectively widening the gap and providing an opening into the gap for guiding the ear bud therein.

3. The holder according to claim 1, further comprising a cover layer extending over the receiving member for providing an enhanced frictional contact with the ear bud carried thereby.

4. The holder according to claim 1, wherein the opposing first and second upright members include a recessed portion extending within an outside surface thereof, the recessed portion forming a pocket.

5. The holder according to claim 1, wherein the first surface of the base comprises an arcuate surface.

6. The holder according to claim 1, wherein the receiving member comprises a generally U-shaped member defined by the first and second upright members forming the gap therebetween.

7. The holder of claim 1, wherein the attachment means comprises a mounting tab connectable within a slot formed in the attachment member to secure engagement therebetween, and wherein the attachment member is at least one of an adhesive member, a suction cup member, and a mounting clip.

8. The holder according to claim 1, further comprising a light source carried by the holder, the light source sufficiently illuminating at least a portion of the holder for a locating thereof in a darkened environment.

9. The holder according to claim 8, wherein the light source is carried by the base, and wherein the arm members and the receiving member are formed from a material capable of transmitting light and providing an illumination thereof.

10. The holder according to claim 8, further comprising an optical fiber operable with the light source, the optical fiber extending to preselected portions of the holder for providing illumination thereto.

11. A mobile telephone headset holding system comprising:
a headset having at least one of an ear bud and an ear hook extending from a body thereof, the ear bud having a generally bulbous shaped portion and a post extending therefrom connecting the ear bud to the body; and
a holder carrying the headset, the holder comprising:
a base having a first surface and an opposing second surface;
first and second arm members extending outwardly from the base, the first and second arm members having proximal and opposing distal ends, wherein the proximal ends are affixed to the first surface of the base, and wherein the first arm member is spaced from the second arm member so as to form an opening therebetween; and
a receiving member attached to the distal ends of the first and second arm members so as to be in a spaced relation to the first surface of the base, the receiving member having opposing first and second upright members forming a gap therebetween dimensioned for loosely receiving the ear bud of the mobile telephone headset within said gap and said opening,
wherein the headset is carried by the holder by at least one of the post positioned within the gap and the bulbous shaped portion of the ear bud positioned between the receiving member and the base, and the ear hook carried between the base and the receiving member.

12. The system according to claim 11, further comprising:
attachment means carried on the second surface of the base; and
an attachment member removably connected to the attachment means for removably securing the holder and thus the headset to a support structure.

13. The system according to claim 12, further comprising the support structure, wherein the support structure comprises an interior portion of a motor vehicle.

14. The system according to claim 11, wherein the first and second upright members include tapered free ends, the free ends sufficiently tapered for effectively widening the gap and providing an opening into the gap for freely guiding the post therein.

15. The holder according to claim 11, further comprising a cover layer extending over the receiving member for providing an enhanced frictional contact with the post carried thereby.

16. The holder according to claim 11, wherein the first surface of the base comprises an arcuate surface sufficiently curved for slidably receiving the ear hook and guiding the ear hook onto the arm members for a carrying thereof.

17. The holder according to claim 11, wherein the receiving member comprises a generally U-shaped member defined by the first and second upright members forming the gap therebetween.

18. The holder according to claim 11, further comprising a light source carried by the holder, the light source sufficiently illuminating at least a portion of the holder for a locating thereof in a darkened environment.

19. The holder according to claim 18, wherein the light source is carried by the base, and wherein the arm members and the receiving member are formed from a material capable of transmitting light and providing an illumination thereof.

20. The holder according to claim 18, further comprising an optical fiber operable with the light source, the optical fiber extending to preselected portions of the holder for providing illumination thereto.

21. A holder comprising:
a base having a first surface and an opposing second surface;
first and second arm members extending outwardly from the base, the first and second arm members having proximal and opposing distal ends, wherein the proximal ends are affixed to the first surface of the base, and wherein the first arm member is spaced from the second arm member so as to form an opening therebetween;
a receiving member attached to the distal ends of the first and second arm members so as to be in a spaced relation to the first surface of the base, the receiving member having opposing first and second upright members forming a gap therebetween dimensioned for loosely receiving an ear bud of a mobile telephone headset with said gap and said opening;
an attachment member removably connected to the base for removably securing the holder to a support structure.

22. The holder according to claim 21, wherein the first and second upright members include tapered free ends, the free ends sufficiently tapered for effectively widening the gap and providing an opening into the gap.

23. The holder according to claim 21, further comprising a cover layer extending over the receiving member.

24. The holder according to claim 21, wherein the first surface of the base comprises an arcuate surface.

25. The holder according to claim 21, wherein the receiving member comprises a generally U-shaped member defined by the first and second upright members forming the gap therebetween.

26. The holder according to claim 21, further comprising a light source carried by the holder, the light source sufficiently illuminating at least a portion of the holder for a locating thereof in a darkened environment.

27. The holder according to claim 26, wherein the light source is carried by the base, and wherein the arm members and the receiving member are formed from a material capable of transmitting light and providing an illumination thereof.

28. The holder according to claim 26, further comprising an optical fiber operable with the light source, the optical fiber extending to preselected portions of the holder for providing illumination thereto.

\* \* \* \* \*